Dec. 30, 1952  R. C. CLERK  2,623,619
FRICTION CLUTCH AND BRAKE
Filed June 23, 1948
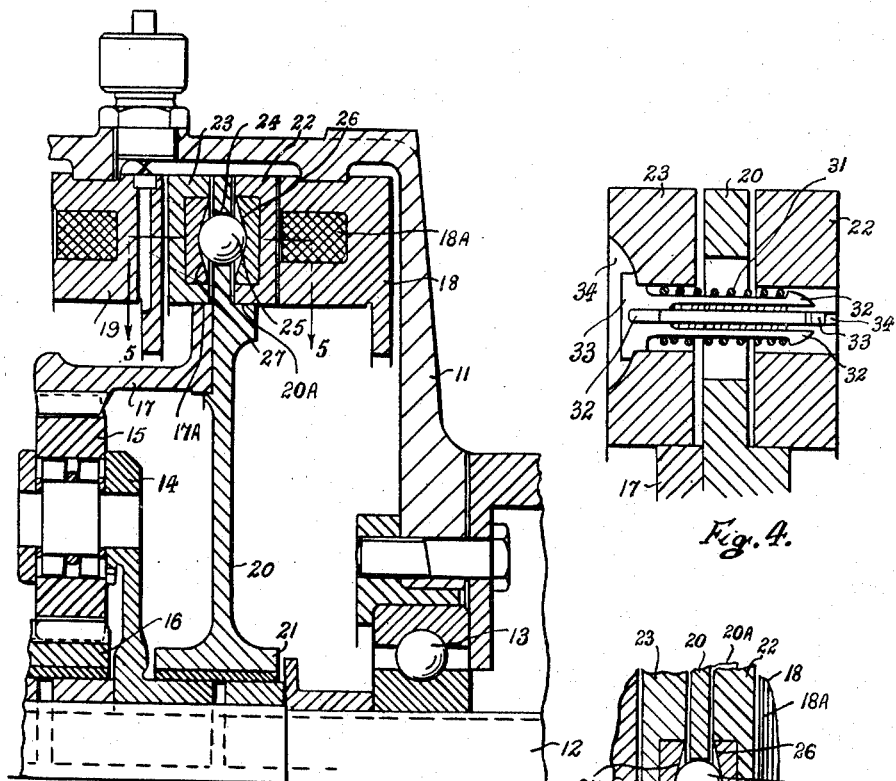
Fig.1.
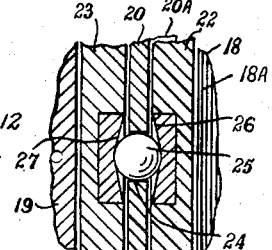
Fig.4.
Fig.5.
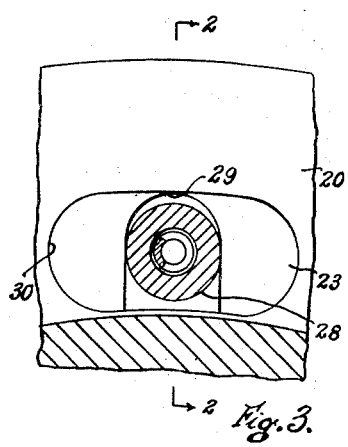
Fig.3.
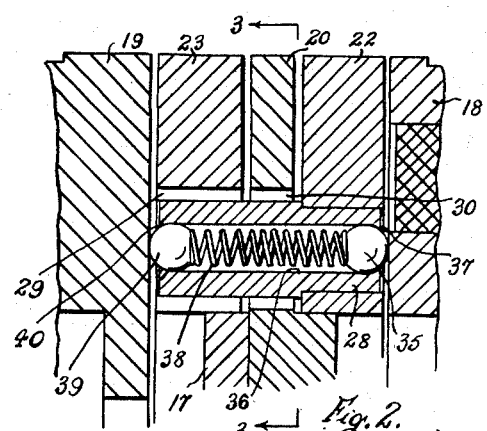
Fig.2.
INVENTOR
Robert Cecil Clerk
By Richardson David + Norton
his ATT'YS Patented Dec. 30, 1952

2,623,619

UNITED STATES PATENT OFFICE 2,623,619

FRICTION CLUTCH AND BRAKE

Robert Cecil Clerk, Richmond, England

Application June 23, 1948, Serial No. 34,781
In Great Britain September 3, 1946

10 Claims. (Cl. 192—35)

This invention relates to friction clutches and friction brakes of the torque-assisted type, suitable for use for example as ratio-selecting means in change-speed, reversing or other selective gears. The term "clutch" will, for the sake of brevity, hereinafter be used to include a brake, for example one employed to prevent rotation of a reaction element in planetary gearing. The term "torque-assisted type" implies that the force operating to engage the friction surfaces of the clutch together is amplified by the torque transmitted through the clutch.

Clutches having axially slidable friction elements are often likely to be erratic in operation or to develop thrust in rotary members to which they are connected, owing to friction between the slidable element and the splines, pins or equivalent mounting means by which torque is applied to it.

An object of this invention is to reduce or overcome this difficulty in a torque-assisted friction clutch by avoiding the necessity for axial sliding of parts, one over the other, between which a substantial torque is being transmitted.

Another object is to ensure that, when the friction members of the clutch are constituted by an annular electromagnet and an annular armature, the tendency of the armature to stick to the electromagnet when the latter is de-energised is overcome.

Further objects and advantages of the invention will be apparent from the following description of an embodiment given by way of example and with reference to the accompanying drawings, as applied to an electromagnetically-actuated friction brake used as a stop for selecting reverse gear in a planetary change-speed gearing. In the drawings —

Figure 1 is a sectional side elevation of a part of this gearing,

Figure 2 is a section, to a larger scale, of a part of the mechanism shown in Figure 1, and on a different plane containing the gear axle, the section being on the line 2—2 in Figure 3, Figure 3 is a section on the line 3—3 in Figure 2, Figure 4 is a section, corresponding to Figure 2, but on yet another plane containing the gear axis, and Figure 5 is a section on the line 5—5 in Figure 1.

The mechanism shown in Figure 1 includes a gear-box consisting of a lower half (not shown) and an upper half 11. An output shaft 12 is rotatable in a bearing 13, and to the shaft 12 is keyed a planet-carrier 14 having planet pinions such as 15 meshing with a sun wheel 16 and an annulus gear 17. Reverse is obtained by restraining rotation of the annulus gear 17 and causing the sun gear 16 to be rotated backwards by other trains of the gearing, not shown. The gearing is fully described in my patent application Serial No. 34,782, filed June 23, 1948 (Patent No. 2,580,891).

The reverse brake is arranged as follows: Two annular friction members are spaced apart axially: one of them is a fixed channel-section annular electromagnet 18 having a winding 18A and disposed with its channel opening towards the other, which is the back portion of an annular channel-section electromagnet 19 forming a fixed part of another brake of the gearing. The annular poles of the magnet 18 form the friction faces. A cage is constituted by an annular plate 20 fixed to the annulus gear 17 and disposed in the middle of the space between the fixed friction members 18 and 19. The cage has a hub 21 bearing on the exterior of the hub portion of the planet-carrier 14. Two rotary friction rings 22 and 23 of rectangular section are located in the spaces between the cage 20 and the fixed friction members 18 and 19 respectively and are kept coaxial with the gear by bearings 20A and 17A on the cage plate 20 and on the annulus gear 17 respectively. The ring 22 adjoining the magnet 18 acts as an armature. Three or more cylindrical holes, such as 24, uniformly distributed around the cage with their axes parallel to the gear axis, slidably house spreader means, constituted by hardened steel balls, such as 25, each partly accommodated in two conical camming pockets 26 and 27 formed respectively in hardened steel inserts in the two friction rings 22 and 23. These two rings may be constrained to rotate in unison by dowels fast in one ring, slidable axially in the other and passing through circumferential slots in the cage. One such dowel is denoted by 28 in Figures 2 and 3. The dowel is a driving fit in the ring 22 and an axially sliding fit in a radial slot 29 in the ring 23, and it passes through a circumferential slot 30 in the cage 20.

Spring tension links passing through circumferential slots in the cage, tie the rotary friction rings together and normally keep the brake fully disengaged. One such link is shown in Figure 4. It consists of a helical spring 31 compressed between the barbed ends 32 of the prongs of two fork-shaped terminations stamped out of sheet metal. The heads 33 of these terminations are shaped as transverse keys engaged in arcuate slots 34 sunk in the faces of the rings 22 and 23.

In operation, when the magnet 18 is energised, it attracts and frictionally engages the armature ring 22, and the rings 22 and 23 are thereby constrained to move in the lagging direction relatively to the cage 20 so that the balls 25 cooperate with the camming pockets 26 and 27 and thereby force the rings 22 and 23 apart into full frictional engagement with the fixed friction members 18 and 19 so that the cage is arrested.

No substantial torque is transmitted from the cage 20 to the balls 25 until the rotary friction rings 22 and 23 are engaged with the fixed friction members 18 and 19. Consequently there is no tendency for the balls 25 to impose an axial thrust on the cage 20.

When the magnet 18 is de-energised in order to release the brake, remanent magnetism tends to make the armature ring 22 stick to the magnet. Full disengagement is ensured by providing resilient plungers projecting axially from the face of the armature ring 22 and co-operating with the electromagnet 18. These plungers are constituted by balls 35 (Figure 2) slidable in axial bores 36 in the dowels 28. An internal flange 37 at the end of the bore limits the distance to which the ball can project beyond the face of the ring 22. The ball is loaded by a compression spring 38. A second ball 39 may be placed at the other end of the dowel and loaded by the same spring, being retained in the dowel by a peened flange 40 which permits the ball to project far enough from the dowel to co-operate with the ring 19 and thereby prevent the air-gap between the rings 18 and 22 from becoming excessive. The plunger balls 35 and 39 may be arranged to ensure that, when the brake is disengaged, the clearance between the rings 18 and 22 is about three times that between the rings 19 and 23. Suitable clearances for a brake 10 in. in external diameter are 0.045 and 0.015 in.

I claim:

1. A friction clutch of the torque-assisted type comprising two relatively rotatable elements, one of which includes a first two friction members coupled to one of said elements and disposed co-axially and spaced apart, and the other of which includes a cage fixedly coupled to and supplied with driving torque from said other element and disposed co-axially with and between said two friction members, a second two friction members disposed between the cage and the first two friction members respectively, at least two spreader members distributed around the cage and constrained to slide therein in directions parallel to the clutch axis, each of the spreader members co-operating with face-camming surfaces on the second two friction members respectively, and actuating means arranged to initiate engagement between at least one of said first two friction members and the adjacent one of said second two friction members.

2. A friction clutch of the torque-assisted type comprising two relatively rotatable elements, one of which includes a first two friction members coupled to one of said elements and disposed coaxially and spaced apart, and the other of which includes a cage fixedly coupled to and supplied with driving torque from said other element and disposed co-axially with and between said two friction members, a second two friction members disposed between the cage and the first two friction members respectively, at least two spreader members distributed around the cage and constrained to slide therein in directions parallel to the clutch axis, each of the spreader members co-operating with face-camming surfaces on the second two friction members respectively, actuating means arranged to initiate engagement between at least one of said first two friction members and the adjacent one of said second two friction members, and dowels passing through said cage with clearance in the circumferential direction about the clutch axis and coupling together said second two friction members.

3. A friction clutch of the torque-assisted type comprising two relatively rotatable elements, one of which includes a first two friction members coupled to one of said elements and disposed co-axially and spaced apart, and the other of which includes a cage fixedly coupled to and supplied with driving torque from said other element and disposed co-axially with and between said two friction members, a second two friction members disposed between the cage and the first two friction members respectively, at least two spreader members distributed around the cage and constrained to slide therein in directions parallel to the clutch axis, each of the spreader members co-operating with face-camming surfaces on the second two friction members respectively, actuating means arranged to initiate engagement between at least one of said first two friction members and the adjacent one of said second two friction members, and spring tension links passing through said cage with clearance in the circumferential direction about the clutch axis and coupling together said second two friction members.

4. A friction clutch of the torque-assisted type comprising two relatively rotatable elements, one of which includes a first two friction members coupled to one of said elements and disposed co-axially and spaced apart, and the other of which includes a cage fixedly coupled to and supplied with driving torque from said other element and disposed co-axially with and between said two friction members, a second two friction members disposed between the cage and the first two friction members respectively, at least two balls slidable in cylindrical holes formed in the cage with their axes parallel to the clutch axis, said balls co-operating with face-camming surfaces on the second two friction members respectively, and actuating means arranged to initiate engagement between at least one of said first two friction members and the adjacent one of said second two friction members.

5. A friction clutch of the torque-assisted type comprising two relatively rotatable elements, one of which includes a first two friction members coupled to said one element, disposed co-axially and spaced apart, and the other of which includes a cage coupled to said other element and disposed co-axially with and between said two friction members, a second two friction members disposed between the cage and the first two friction members respectively, and at least two spreader members distributed around the cage and constrained to slide therein in directions parallel to the clutch axis, each of the spreader members co-operating with face-camming surfaces on the second two friction members respectively, at least one of said first two friction members and the adjacent one of said second two friction members together constituting an annular electromagnet and an annular armature co-operating to form an electromagnetically actuated friction clutch serving as means arranged to initiate engagement.

6. A friction clutch of the torque-assisted type comprising two relatively rotatable elements, one of which includes a first two friction members coupled to said one element, disposed co-axially and spaced apart, and the other of which includes a cage coupled to said other elements and disposed co-axially with and between said two friction members, a second two friction members disposed between the cage and the first two friction members respectively, at least two spreader members distributed around the cage and constrained to slide therein in directions parallel to the clutch axis, each of the spreader members co-operating with face-camming surfaces on the second two friction members respectively, at least one of said first two friction members and the adjacent one of said second two friction members together constituting an annular electromagnet and an annular armature co-operating to form an electromagnetically actuated friction clutch serving as means arranged to initiate engagement, and resilient plungers projecting from one of the co-operating faces of said electromagnet and said armature for co-operation with the other of said faces in order to prevent the armature from sticking to the electromagnet when the latter is de-energised.

7. A friction clutch of the torque-assisted type comprising two relatively rotatable elements, one of which includes a first two friction members coupled to said one element, disposed co-axially and spaced apart, and the other of which includes a cage coupled to said other element and disposed co-axially with and between said two friction members, a second two friction members disposed between the cage and the first two friction members respectively, at least two spreader members distributed around the cage and constrained to slide therein in directions parallel to the clutch axis, each of the spreader members co-operating with face-camming surfaces on the second two friction members respectively, at least one of said first two friction members and the adjacent one of said second two friction members together constituting an annular electromagnet and an annular armature co-operating to form an electromagnetically actuated friction clutch serving as means arranged to initiate engagement, dowels passing through said cage with clearance in the circumferential direction about the clutch axis and coupling together said second two friction members, and resilient plungers projecting from one of the co-operating faces of said electromagnet and said armature for co-operation with the other of said faces in order to prevent the armature from sticking to the electromagnet when the latter is de-energised, said plungers being mounted in said dowels, which are fixed to one of said second two friction elements.

8. A clutch as claimed in claim 7, wherein each of said dowels is fixed to the one of said second two friction members that constitutes the magnetic clutch element.

9. A friction clutch of the torque-assisted type comprising two relatively rotatable elements, one of which includes a first two friction members coupled to said one element, disposed co-axially and spaced apart, and the other of which includes a cage coupled to said other element and disposed co-axially with and between said two friction members, a second two friction members disposed between the cage and the first two friction members respectively, at least two spreader members distributed around the cage and constrained to slide therein in directions parallel to the clutch axis, each of the spreader members co-operating with face-camming surfaces on the second two friction members respectively, at least one of said first two friction members and the adjacent one of said second two friction members together constituting an annular electromagnet and an annular armature co-operating to form an electromagnetically actuated friction clutch serving as means arranged to initiate engagement, resilient plungers projecting from one of the co-operating faces of said electromagnet and said armature for co-operating with the other of said faces in order to prevent the armature from sticking to the electromagnet when the latter is de-energised, and resilient plungers projecting from one of the co-operating faces of the other of said first and second two friction members for co-operating with the other of the last-mentioned faces in order to limit the air gap between the armature and the electromagnet.

10. A friction clutch of the torque-assisted type comprising two relatively rotatable elements, one of which includes a first two friction members coupled to said one element, disposed co-axially and spaced apart, and the other of which includes a cage coupled to said other element and disposed co-axially with and between said two friction members, a second two friction members disposed between the cage and the first two friction members respectively, at least two spreader members distributed around the cage and constrained to slide therein in directions parallel to the clutch axis, each of the spreader members co-operating with face-camming surfaces on the second two friction members respectively, at least one of said first two friction members and the adjacent one of said second two friction members together constituting an annular electromagnet and an annular armature co-operating to form an electromagnetically actuated friction clutch serving as means arranged to initiate engagement, spring tension links passing through said cage with clearance in the circumferential direction about the clutch axis and coupling together said second two friction members, dowels passing through said cage with clearance in the circumferential direction about the clutch axis and coupling together said second two friction members, resilient plungers projecting from one of the co-operating faces of said electromagnet and said armature for co-operation with the other of said faces in order to prevent the armature from sticking to the electromagnet when the latter is de-energised, said plungers being mounted in said dowels, which are fixed to the one of said second two friction members that constitutes the magnetic clutch element, and additional resilient plungers mounted in said dowels so as to project from one of the co-operating faces of the other of said first and second two friction members for co-operating with the other of the last-mentioned faces in order to limit the air gap between the armature and the electromagnet.

ROBERT CECIL CLERK.

REFERENCES CITED

The following references are of record in the file of this patent:

UNITED STATES PATENTS

| Number | Name | Date |
|---|---|---|
| 1,696,879 | Chase | Dec. 25, 1928 |
| 2,448,763 | Bloomfield | Sept. 7, 1948 |

FOREIGN PATENTS

| Number | Country | Date |
|---|---|---|
| 599,462 | Great Britain | Mar. 12, 1948 |
| 599,540 | Great Britain | Mar. 15, 1948 |